(12) United States Patent
Sainath

(10) Patent No.: US 8,949,659 B2
(45) Date of Patent: Feb. 3, 2015

(54) SCHEDULING WORKLOADS BASED ON DETECTED HARDWARE ERRORS

(71) Applicant: International Business Machines Corporation, Armonk, NY (US)

(72) Inventor: Venkatesh Sainath, Bangalore (IN)

(73) Assignee: International Business Machines Corporation, Armonk, NY (US)

(*) Notice: Subject to any disclaimer, the term of this patent is extended or adjusted under 35 U.S.C. 154(b) by 274 days.

(21) Appl. No.: 13/654,948

(22) Filed: Oct. 18, 2012

(65) Prior Publication Data
US 2014/0115382 A1    Apr. 24, 2014

(51) Int. Cl.
*G06F 11/00*    (2006.01)

(52) U.S. Cl.
USPC ............... 714/4.2; 714/3; 714/47.2

(58) Field of Classification Search
CPC . G06F 11/20; G06F 11/2002; G06F 11/2005; G06F 11/201; G06F 11/2017; G06F 11/2053
USPC ..................... 714/3, 4.2, 6.2, 47.2
See application file for complete search history.

(56) References Cited

U.S. PATENT DOCUMENTS

| | | | |
|---|---|---|---|
| 6,032,265 A * | 2/2000 | Oguro et al. ............... 714/5.11 |
| 7,802,073 B1 | 9/2010 | Cheng et al. |
| 7,937,615 B2 * | 5/2011 | Takamoto et al. ............ 714/10 |
| 8,762,773 B2 * | 6/2014 | Akiyama et al. ............. 714/6.3 |
| 8,812,898 B1 * | 8/2014 | Lahon et al. ................. 714/4.2 |
| 2003/0061530 A1 * | 3/2003 | Hayden ........................... 714/6 |
| 2006/0156130 A1 * | 7/2006 | Huott et al. .................. 714/733 |
| 2006/0212677 A1 * | 9/2006 | Fossum ............................ 712/1 |
| 2006/0248314 A1 * | 11/2006 | Barlow et al. .................. 712/35 |
| 2008/0016374 A1 * | 1/2008 | Gee et al. ...................... 713/300 |
| 2012/0079235 A1 | 3/2012 | Iyer et al. |
| 2014/0115382 A1 * | 4/2014 | Sainath ....................... 714/6.11 |

* cited by examiner

*Primary Examiner* — Joshua Lohn
(74) *Attorney, Agent, or Firm* — Yee & Associates, P.C.; Parashos Kalaitzis

(57) ABSTRACT

Scheduling workloads based on detected hardware errors is provided. In response to determining that a hardware error is detected, it is determined whether the hardware error is a cache error. In response to determining that the hardware error is a cache error, it is determined whether execution of a workload on a processor is changing contents of a cache associated with the cache error more than a threshold value. In response to determining that the execution of the workload on the processor is changing the contents of the cache associated with the cache error more than the threshold value, it is determined whether the cache associated with the cache error is private to a core in the processor. In response to determining that the cache associated with the cache error is private to a core, the execution of the workload is scheduled on a different core of the processor.

20 Claims, 9 Drawing Sheets

| ERRORS 302 | ACTIONS 304 |
|---|---|
| MEMORY ERRORS IN CACHE LINES 306 | CACHE LINES WITH ERRORS ARE DELETED AND MARKED UNUSABLE 308 |
| MEMORY ERRORS IN DIMMs 310 | DIMMs WITH ERRORS ARE ISOLATED AND THOSE MEMORY LOCATIONS ARE MARKED UNUSABLE 312 |
| ERRORS IN FUNTIONAL UNITS WITHIN PROCESSOR 314 | PROCESSOR IS ISOLATED AND MARKED UNUSABLE FOR WORKLOAD SCHEDULING 316 |
| ERRORS IN INTERCONNECT BETWEEN PROCESSOR AND MEMORY 318 | LANE SPARING IS EXECUTED BY DISABLING LANES WITH ERRORS AND ENABLING A NUMBER OF SPARE LANES PROVIDED WITHIN THE INTERCONNECT 320 |
| ERRORS IN INTERCONNECT BETWEEN TWO PROCESSORS ON A SAME NODE OR ON DIFFERENT NODES 322 | LANE SPARING IS EXECUTED BY DISABLING LANES WITH ERRORS AND ENABLING A NUMBER OF SPARE LANES PROVIDED WITHIN THE INTERCONNECT 324 |

TABLE 300

FIG. 3

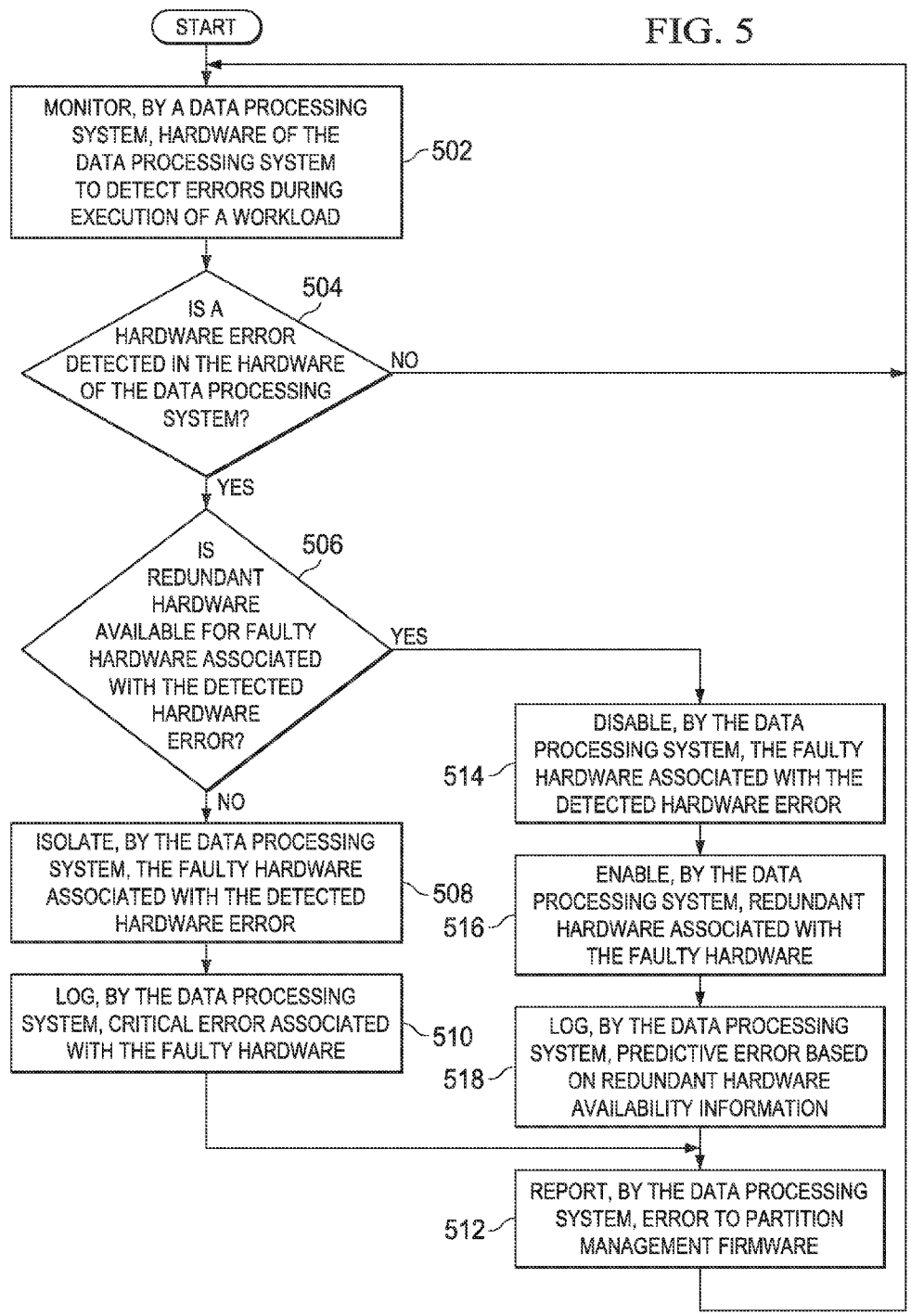

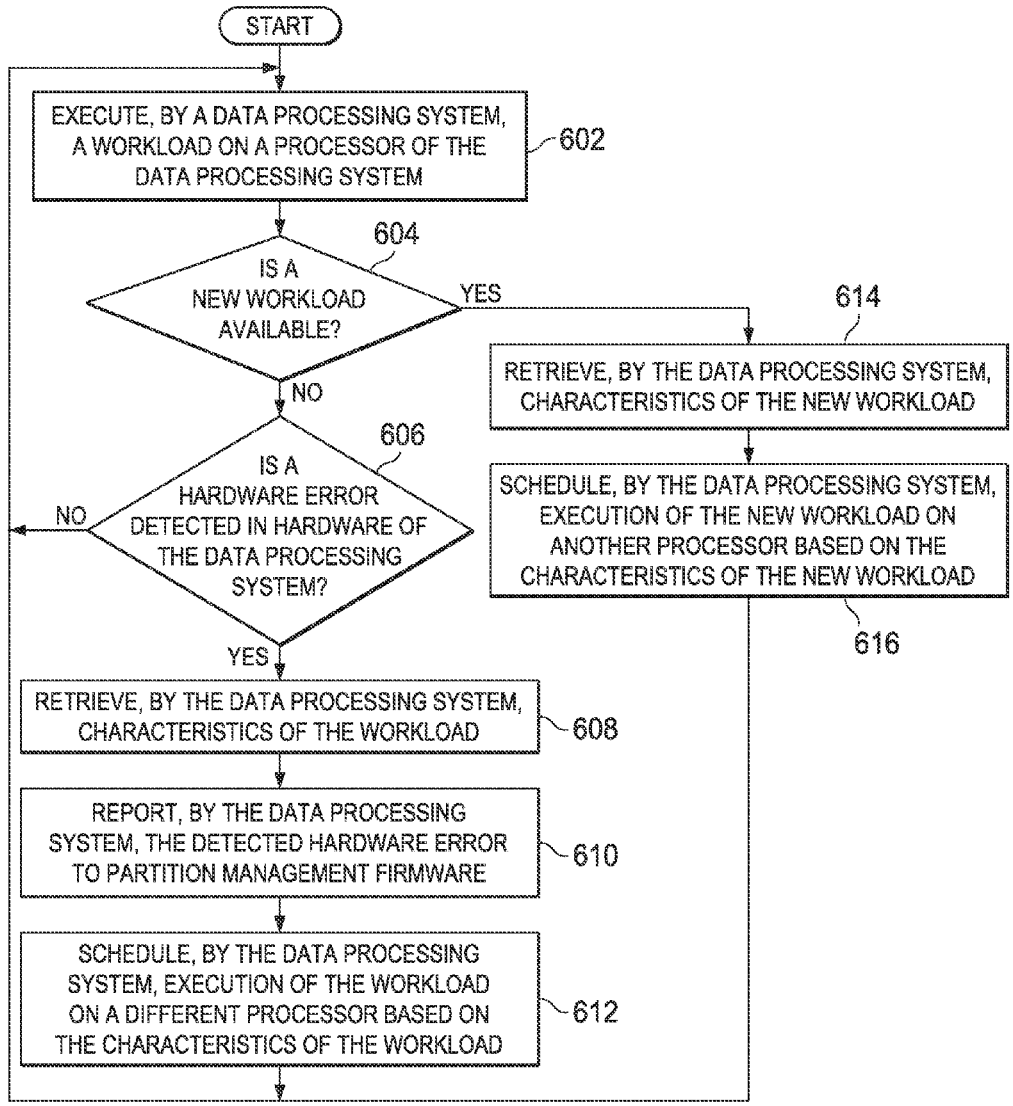

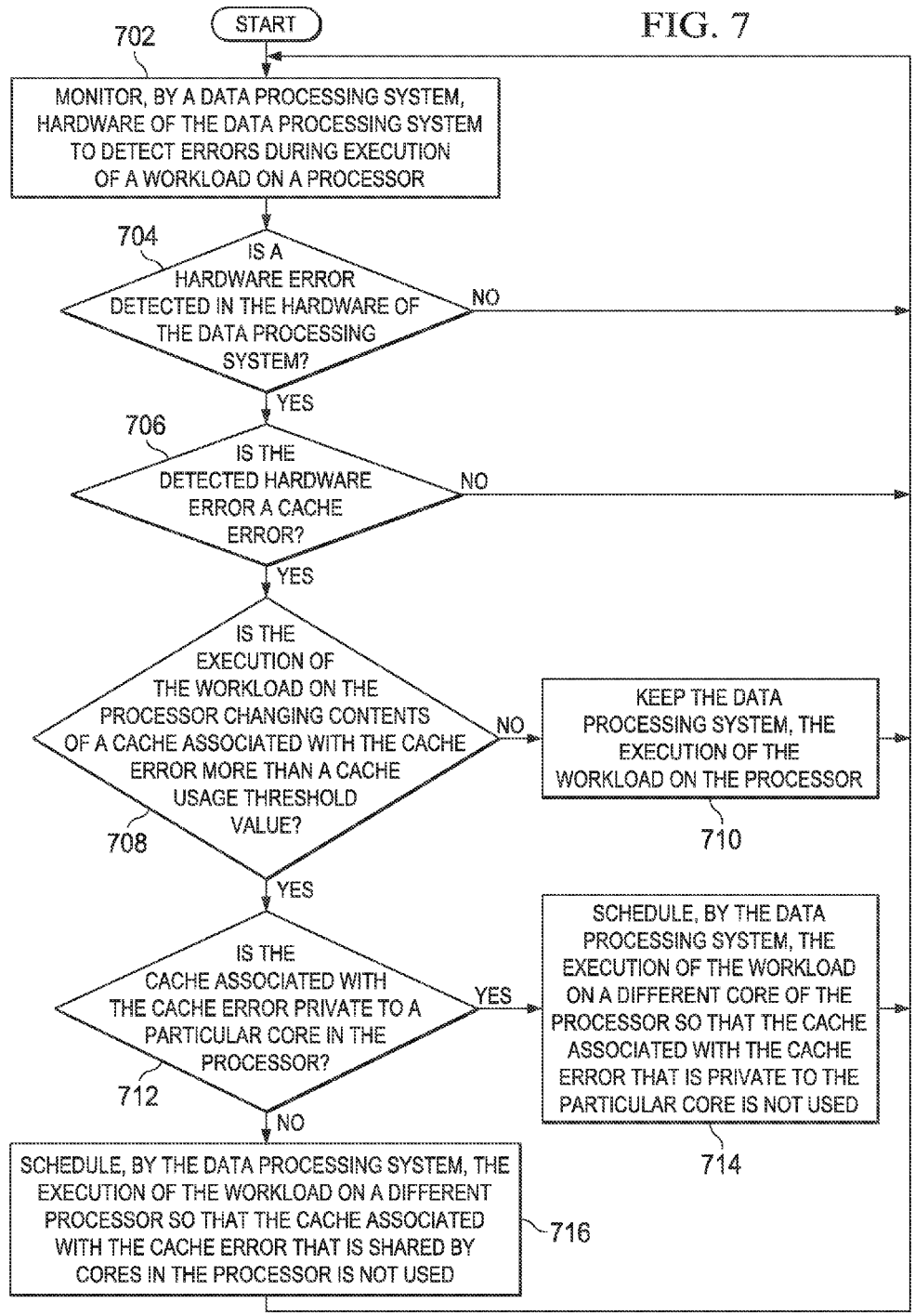

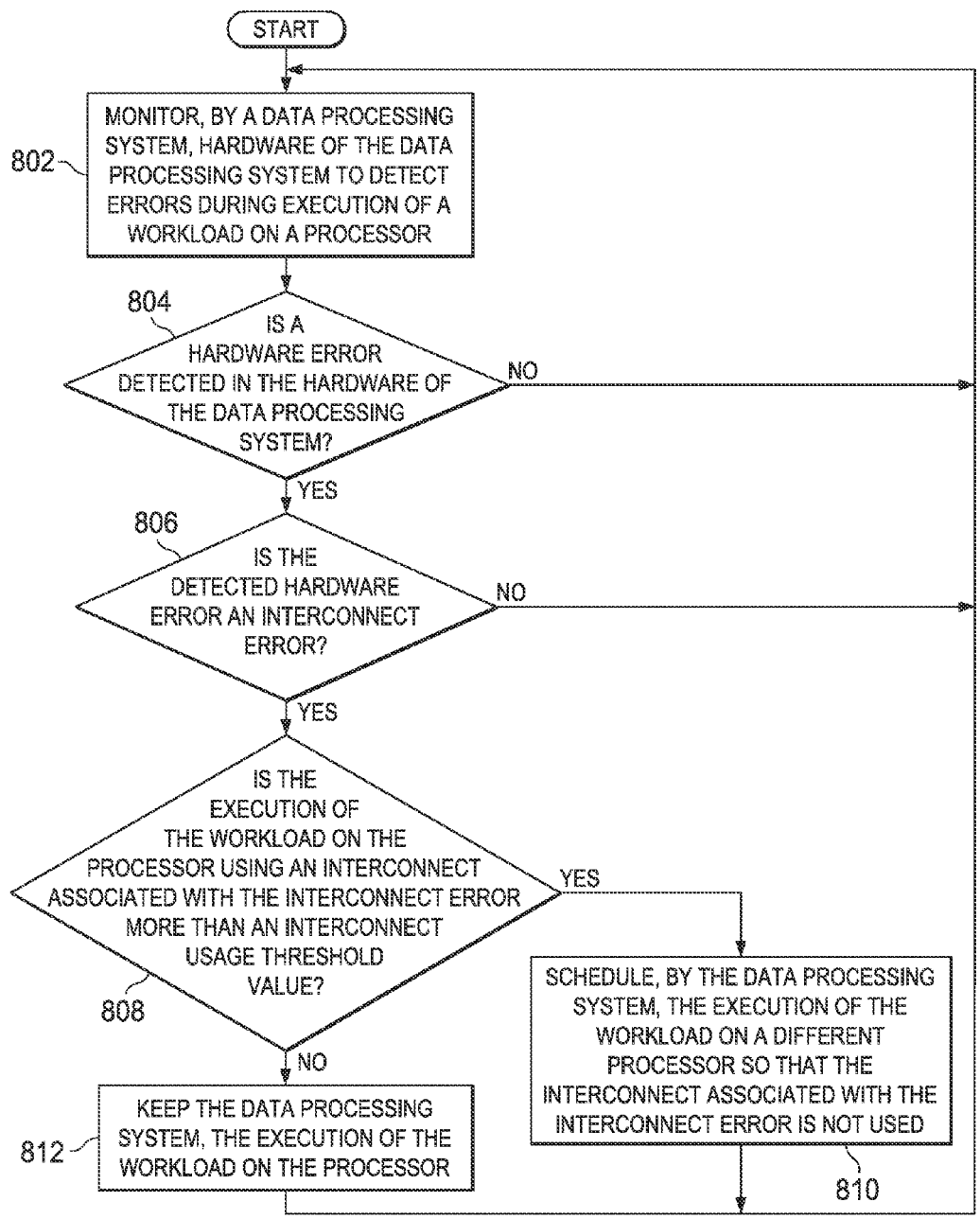

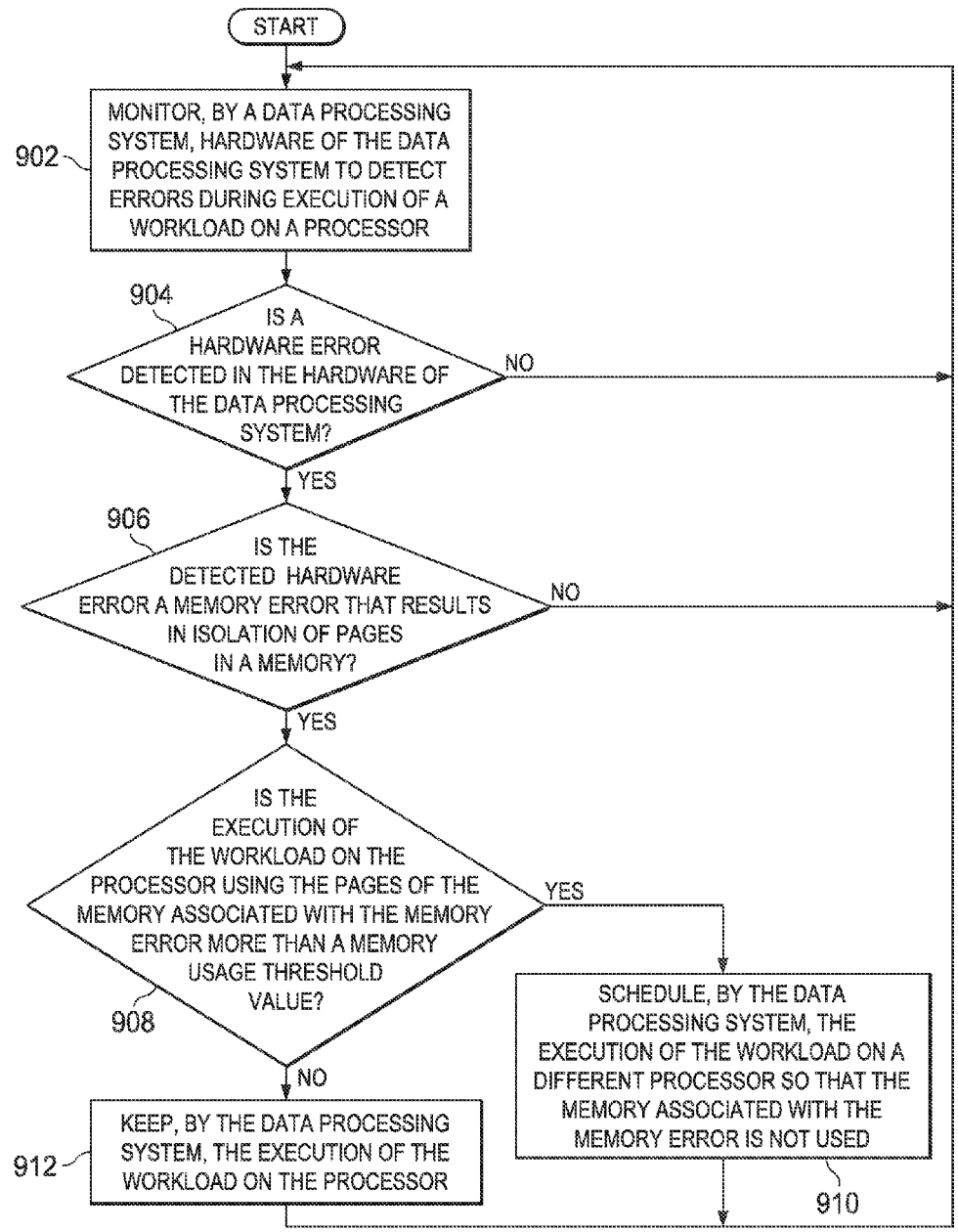

SCHEDULING WORKLOADS BASED ON DETECTED HARDWARE ERRORS

BACKGROUND

1. Field

The disclosure relates generally to a computer implemented method, data processing system, and computer program product for scheduling a workload on a processor within a logical partition based on detected hardware errors within a data processing system.

2. Description of the Related Art

Increasingly large symmetric multi-processor data processing systems are not being used as single large data processing systems. Instead, these types of data processing systems are being partitioned and used as smaller systems. These systems are also referred to as logical partitioned (LPAR) data processing systems. A logical partitioned functionality within a data processing system allows multiple copies of a single operating system or multiple heterogeneous operating systems to be simultaneously run on a single data processing system platform. A partition, within which an operating system image runs, is assigned a non-overlapping subset of the platform's resources. These platform allocable resources include one or more architecturally distinct processors and their interrupt management area, regions of system memory, and input/output (I/O) adapter bus slots. The partition's resources are represented by the platform's firmware to the operating system image.

Each distinct operating system or image of an operating system running within a platform is protected from each other, such that software errors on one logical partition cannot affect the correct operation of any of the other partitions. This protection is provided by allocating a disjointed set of platform resources to be directly managed by each operating system image and by providing mechanisms for ensuring that the various images cannot control any resources that have not been allocated to that image. Furthermore, software errors in control of an operating system's allocated resources are prevented from affecting the resources of any other image. Thus, each image of the operating system, or each different operating system, directly controls a distinct set of allocable resources within the platform.

With respect to hardware resources in a logical partitioned data processing system, these resources are shared disjointly among various partitions. These resources may include, for example, input/output (I/O) adapters, memory DIMMs, non-volatile random access memory (NVRAM), and hard disk drives. Each partition within a logical partitioned data processing system may be booted and shut down over and over without having to power-cycle the entire data processing system.

SUMMARY

According to one embodiment of the present invention, a computer implemented method for scheduling workloads based on detected hardware errors is provided. In response to a data processing system determining that a hardware error is detected in hardware of the data processing system, the data processing system determines whether the hardware error is a cache error. In response to the data processing system determining that the hardware error is a cache error, the data processing system determines whether execution of a workload on a processor is changing contents of a cache associated with the cache error more than a cache usage threshold value. In response to the data processing system determining that the execution of the workload on the processor is changing the contents of the cache associated with the cache error more than the cache usage threshold value, the data processing system determines whether the cache associated with the cache error is private to a particular core in the processor. In response to the data processing system determining that the cache associated with the cache error is private to a particular core in the processor, the data processing system schedules the execution of the workload on a different core of the processor so that the cache associated with the cache error that is private to the particular core is not used. In other embodiments of the present invention, a data processing system and a computer program product for scheduling workloads based on detected hardware errors are provided.

BRIEF DESCRIPTION OF THE SEVERAL VIEWS OF THE DRAWINGS

FIG. 3 is a diagram illustrating an example of a table in accordance with an illustrative embodiment;

FIG. 5 is a flowchart illustrating a process for error detection and reporting in accordance with an illustrative embodiment;

FIG. 6 is a flowchart illustrating a process for scheduling execution of a workload based on hardware errors in accordance with an illustrative embodiment;

FIG. 7 is a flowchart illustrating a process for scheduling execution of a workload based on cache errors in accordance with an illustrative embodiment;

FIG. 8 is a flowchart illustrating a process for scheduling execution of a workload based on interconnect errors in accordance with an illustrative embodiment; and FIG. 9 is a flowchart illustrating a process for scheduling execution of a workload based on memory errors in accordance with an illustrative embodiment.

DETAILED DESCRIPTION

Figure 1:
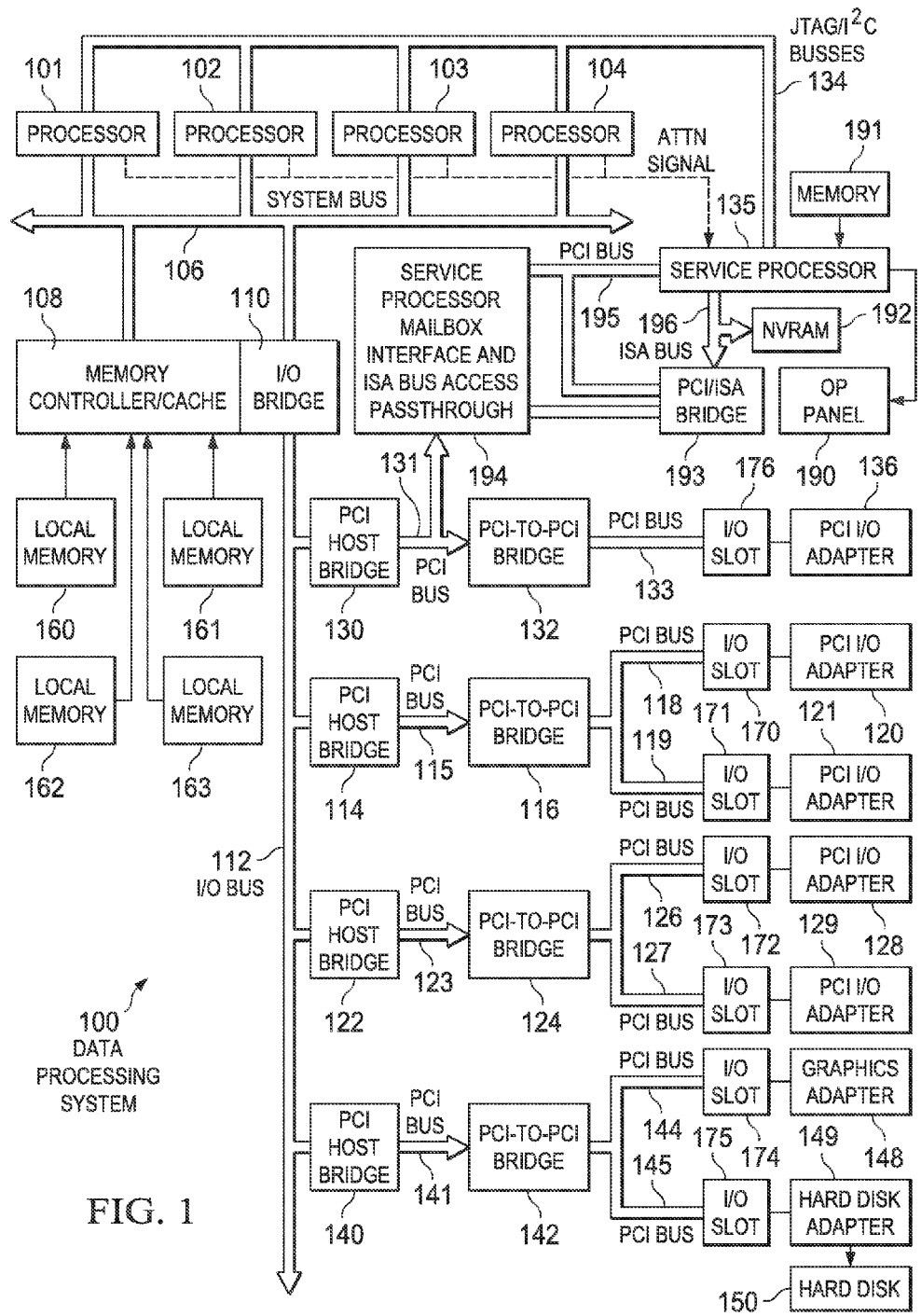
FIG. 1 is a diagram of a data processing system in which illustrative embodiments may be implemented.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.), or an embodiment combining software and hardware aspects that may all generally be referred to herein as a "circuit," "module," or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list)

of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 2:
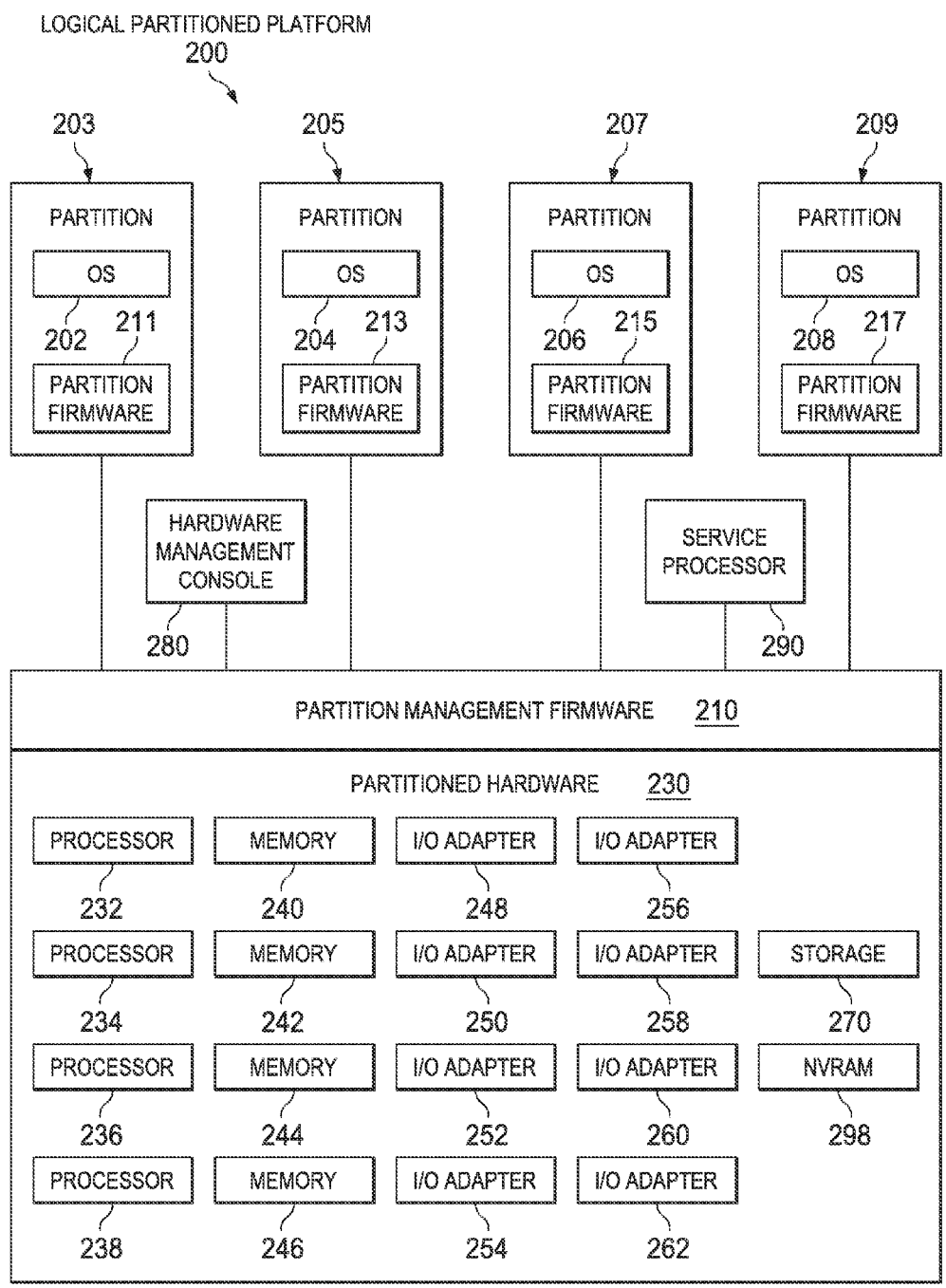
FIG. 2 is a diagram illustrating an example of a logical partitioned platform in which illustrative embodiments may be implemented.

With reference now to the figures, and in particular, with reference to FIGS. 1 and 2, diagrams of data processing environments are provided in which illustrative embodiments may be implemented. It should be appreciated that FIGS. 1 and 2 are only meant as examples and are not intended to assert or imply any limitation with regard to the environments in which different embodiments may be implemented. Many modifications to the depicted environments may be made.

FIG. 1 depicts a block diagram of a data processing system in which illustrative embodiments may be implemented. Data processing system 100 is an example of a computer in which computer usable program code or instructions implementing processes of illustrative embodiments may be located. Data processing system 100 may be a symmetric multiprocessor (SMP) system including processors 101, 102, 103, and 104, which connect to system bus 106. For example, data processing system 100 may be an IBM eServer, a product of International Business Machines Corporation in Armonk, N.Y., implemented as a server computer within a network. Alternatively, a single processor system may be employed. Also, it should be noted that each processor in data processing system 100 may include two or more cores with interconnects between each of the cores. An interconnect is a communication interface device or channel between hardware devices, such as between processors in the same data processing system or in different data processing systems, between cores in the same processor and in different processors, and between processors or cores and memory devices. A memory device may be, for example, a cache or a dual in-line memory module (DIMM). Further, one interconnect device may include a set of two or more redundant lanes or spare lanes of communication between the hardware devices.

Also connected to system bus 106 is memory controller/cache 108, which provides an interface to local memories 160, 161, 162, and 163. Local memories 160, 161, 162, and 163 are examples of computer readable storage devices. A computer readable storage device is any piece of hardware that is capable of storing information, such as, for example, without limitation, data, computer usable program code in functional form, and/or other suitable information either on a transient basis and/or a persistent basis. I/O bridge 110 connects to system bus 106 and provides an interface to I/O bus 112. Memory controller/cache 108 and I/O bridge 110 may be integrated as depicted.

Data processing system 100 is a logical partitioned (LPAR) data processing system. Thus, data processing system 100 may have multiple heterogeneous operating systems (or multiple instances of a single operating system) running simultaneously. Each of these multiple operating systems may have any number of software programs executing within it. Data processing system 100 is logically partitioned such that different PCI I/O adapters 120, 121, 128, 129, and 136, graphics adapter 148, and hard disk adapter 149 may be assigned to different logical partitions. In this case, graphics adapter 148 connects to a display device (not shown), while hard disk adapter 149 connects to and controls hard disk 150. Hard disk 150 also is an example of a computer readable storage device.

Thus, for example, suppose data processing system 100 is divided into three logical partitions, P1, P2, and P3. Each of PCI I/O adapters 120, 121, 128, 129, and 136, graphics adapter 148, hard disk adapter 149, each of host processors 101, 102, 103, and 104, and memory from local memories 160, 161, 162, and 163 is assigned to each of the three partitions. In these examples, memories 160, 161, 162, and 163 may take the form of dual in-line memory modules (DIMMs). DIMMs are not normally assigned on a per DIMM basis to partitions. Instead, a partition will get a portion of the overall memory seen by the platform. For example, processor 101, some portion of memory from local memories 160, 161, 162, and 163, and I/O adapters 120, 128, and 129 may be assigned to logical partition P1; processors 102 and 103, some portion of memory from local memories 160, 161, 162, and 163, and PCI I/O adapters 121 and 136 may be assigned to partition P2; and processor 104, some portion of memory from local memories 160, 161, 162, and 163, graphics adapter 148 and hard disk adapter 149 may be assigned to logical partition P3.

Each operating system executing within data processing system 100 is assigned to a different logical partition. Thus, each operating system executing within data processing system 100 may access only those I/O units that are within its logical partition. Thus, for example, one instance of the Advanced Interactive Executive (AIX) operating system may be executing within partition P1, a second instance (image) of the AIX operating system may be executing within partition P2, and a Linux or OS/400 operating system may be operating within logical partition P3.

Peripheral component interconnect (PCI) host bridge 114 connected to I/O bus 112 provides an interface to PCI local bus 115. PCI I/O adapters 120 and 121 connect to PCI bus 115 through PCI-to-PCI bridge 116, PCI bus 118, PCI bus 119, I/O slot 170, and I/O slot 171. PCI-to-PCI bridge 116 provides an interface to PCI bus 118 and PCI bus 119. PCI I/O adapters 120 and 121 are placed into I/O slots 170 and 171, respectively. Typical PCI bus implementations support between four and eight I/O adapters (i.e., expansion slots for add-in connectors). Each PCI I/O adapter 120-121 provides an interface between data processing system 100 and input/output devices such as, for example, other network computers, which are clients to data processing system 100.

An additional PCI host bridge 122 provides an interface for an additional PCI bus 123. PCI bus 123 connects to a plurality of PCI I/O adapters 128 and 129. PCI I/O adapters 128 and 129 connect to PCI bus 123 through PCI-to-PCI bridge 124, PCI bus 126, PCI bus 127, I/O slot 172, and I/O slot 173. PCI-to-PCI bridge 124 provides an interface to PCI bus 126 and PCI bus 127. PCI I/O adapters 128 and 129 are placed into I/O slots 172 and 173, respectively. In this manner, additional I/O devices, such as, for example, modems or network adapters may be supported through each of PCI I/O adapters 128-129. Consequently, data processing system 100 allows connections to multiple network computers.

A memory mapped graphics adapter 148 is inserted into I/O slot 174 and connects to I/O bus 112 through PCI bus 144, PCI-to-PCI bridge 142, PCI bus 141, and PCI host bridge 140. Hard disk adapter 149 may be placed into I/O slot 175, which connects to PCI bus 145. In turn, this bus connects to PCI-to-PCI bridge 142, which connects to PCI host bridge 140 by PCI bus 141.

A PCI host bridge 130 provides an interface for PCI bus 131 to connect to I/O bus 112. PCI I/O adapter 136 connects to I/O slot 176, which connects to PCI-to-PCI bridge 132 by PCI bus 133. PCI-to-PCI bridge 132 connects to PCI bus 131. This PCI bus also connects PCI host bridge 130 to the service processor mailbox interface and ISA bus access passthrough 194 and PCI-to-PCI bridge 132. Service processor mailbox interface and ISA bus access passthrough 194 forwards PCI accesses destined to the PCI/ISA bridge 193. NVRAM storage 192 connects to the ISA bus 196. Service processor 135 connects to service processor mailbox interface and ISA bus access passthrough logic 194 through its local PCI bus 195. Service processor 135 also connects to processors 101, 102, 103, and 104 via a plurality of JTAG/I$^2$C busses 134. JTAG/I$^2$C busses 134 are a combination of JTAG/scan busses (see IEEE 1149.1) and Phillips I$^2$C busses. However, alternatively, JTAG/I$^2$C busses 134 may be replaced by only Phillips I$^2$C busses or only JTAG/scan busses. All SP-ATTN signals of the host processors 101, 102, 103, and 104 connect together to an interrupt input signal of service processor 135. Service processor 135 has its own local memory 191 and has access to the hardware OP-panel 190.

When data processing system 100 is initially powered up, service processor 135 uses the JTAG/I$^2$C busses 134 to interrogate the system (host) processors 101, 102, 103, and 104, memory controller/cache 108, and I/O bridge 110. At the completion of this step, service processor 135 has an inventory and topology understanding of data processing system 100. Service processor 135 also executes Built-In-Self-Tests (BISTs), Basic Assurance Tests (BATs), and memory tests on all elements found by interrogating the host processors 101, 102, 103, and 104, memory controller/cache 108, and I/O bridge 110. Any error information for failures detected during the BISTs, BATs, and memory tests are gathered and reported by service processor 135.

If a meaningful and valid configuration of system resources is still possible after taking out the elements found to be faulty during the BISTs, BATs, and memory tests, then data processing system 100 is allowed to proceed to load executable computer usable program code into local (host) memories 160, 161, 162, and 163. Service processor 135 then releases host processors 101, 102, 103, and 104 for execution of the computer usable program code loaded into local memory 160, 161, 162, and 163. While host processors 101, 102, 103, and 104 are executing computer usable program code from respective operating systems within data processing system 100, service processor 135 enters a mode of monitoring and reporting errors. The type of items monitored by service processor 135 include, for example, the cooling fan speed and operation, thermal sensors, power supply regulators, and recoverable and non-recoverable errors reported by processors 101, 102, 103, and 104, local memories 160, 161, 162, and 163, and I/O bridge 110.

Service processor 135 saves and reports error information related to all the monitored items in data processing system 100. Service processor 135 also takes action based on the type of errors and defined thresholds. For example, service processor 135 may take note of excessive recoverable errors on a processor's cache memory and decide that this is predictive of a hard failure. Based on this determination, service processor 135 may mark that resource for de-configuration during the current running session and future Initial Program Loads (IPLs). IPLs are also sometimes referred to as a "boot" or "bootstrap". Service processor 135 may also be known as a board management controller (BMC).

Data processing system 100 may be implemented using various commercially available computer systems. For example, data processing system 100 may be implemented using IBM eServer iSeries Model 840 system available from International Business Machines Corporation. Such a system may support logical partitioning using an OS/400 operating system, which is also available from International Business Machines Corporation.

Those of ordinary skill in the art will appreciate that the hardware depicted in FIG. 1 may vary. For example, other peripheral devices, such as optical disk drives and the like, also may be used in addition to or in place of the hardware depicted. The depicted example is not meant to imply architectural limitations with respect to illustrative embodiments.

With reference now to FIG. 2, a diagram illustrating an example of a logical partitioned platform is depicted in which illustrative embodiments may be implemented. The hardware in logical partitioned platform 200 may be implemented as, for example, data processing system 100 in FIG. 1. Logical partitioned platform 200 includes partitioned hardware 230, operating systems 202, 204, 206, 208, and partition management firmware 210. Operating systems 202, 204, 206, and 208 may be multiple copies of a single operating system or multiple heterogeneous operating systems simultaneously run on logical partitioned platform 200. These operating systems may be implemented using OS/400, which are designed to interface with a partition management firmware, such as Hypervisor, which is available from International Business Machines Corporation. OS/400 is used only as an example in these illustrative embodiments. Of course, other types of operating systems, such as AIX and Linux, may be used depending on the particular implementation. Operating systems 202, 204, 206, and 208 are located in partitions 203, 205, 207, and 209. Hypervisor software is an example of software that may be used to implement partition management firmware 210 and is available from International Business Machines Corporation. Firmware is "software" stored in a memory chip that holds its content without electrical power, such as, for example, read-only memory (ROM), programmable ROM (PROM), erasable programmable ROM (EPROM), electrically erasable programmable ROM (EEPROM), and non-volatile random access memory (NVRAM).

Additionally, these partitions also include partition firmware 211, 213, 215, and 217. Partition firmware 211, 213, 215, and 217 may be implemented using initial boot strap code, IEEE-1275 Standard Open Firmware, and runtime abstraction software (RTAS), which is available from International Business Machines Corporation. When partitions 203, 205, 207, and 209 are instantiated, a copy of boot strap code is loaded onto partitions 203, 205, 207, and 209 by partition management firmware 210. Thereafter, control is transferred to the boot strap code with the boot strap code then loading the open firmware and RTAS. The processors associated or assigned to the partitions are then dispatched to the partition's memory to execute the partition firmware.

Partitioned hardware 230 includes processors 232, 234, 236, and 238, memories 240, 242, 244, and 246, input/output (I/O) adapters 248, 250, 252, 254, 256, 258, 260, and 262, and storage unit 270. Each of processors 232, 234, 236, and 238, memories 240, 242, 244, and 246, NVRAM storage 298, and I/O adapters 248, 250, 252, 254, 256, 258, 260, and 262 may be assigned to one of multiple partitions within logical partitioned platform 200, each of which corresponds to one of operating systems 202, 204, 206, and 208.

Partition management firmware 210 performs a number of functions and services for partitions 203, 205, 207, and 209 to create and enforce the partitioning of logical partitioned platform 200. Partition management firmware 210 is a firmware implemented virtual machine identical to the underlying hardware. Thus, partition management firmware 210 allows the simultaneous execution of independent OS images 202, 204, 206, and 208 by virtualizing all the hardware resources of logical partitioned platform 200.

Service processor 290 may be, for example, service processor 135 in FIG. 1. Logical partitioned platform 200 may use service processor 290 to provide various services, such as processing of platform errors in the partitions. These services also may act as a service agent to report errors back to a vendor, such as International Business Machines Corporation. Operations of the different partitions may be controlled through a hardware management console, such as hardware management console 280. Hardware management console 280 is a separate data processing system from which a system administrator may perform various functions including reallocation of resources to different partitions.

During the course of developing illustrative embodiments, it was discovered that multi-core processors have several levels of caches and memory elements (i.e., registers) that may encounter memory errors. In addition, a data processing system with multiple nodes and each node in the system having multiple processors may include several intra node and inter node high speed interconnects that also may encounter errors. These interconnect errors may be corrected by using spare lanes within an interconnect or using a different interconnect.

Similarly, most server processors may address close to 250 gigabytes (GB) of memory at very high bandwidth, which requires high speed interconnects to buffers connected to memory. These memory interconnects also may encounter errors that may be corrected using spare lanes within an interconnect. In order to provide better reliability, availability, and serviceability (RAS) characteristics, illustrative embodiments correct or isolate these errors thereby making these errors transparent to the workload running on those processors and hence avoiding downtime. Though the errors are corrected and made transparent to the workload, the processors are not operating at optimal efficiency in some of these cases. For example, if a cache line encounters an error and the cache line with the error is isolated by deleting the cache line, then that processor ends up using a decreased cache size.

Typically, workloads are scheduled on processors taking into consideration the processors' affinity to the memory devices where the data necessary for execution of the workload is stored. A workload is a task or job that is scheduled to be executed by a processor within a logical partition (LPAR) or virtual machine of a data processing system. However, errors detected or corrected on hardware associated with the processors, such as memory errors or interconnect errors, were not previously taken into consideration when scheduling workloads on processors.

Illustrative embodiments utilize partition management firmware to take into consideration corrected errors or predictive errors, which are detected and recorded by the service processor, when scheduling different workloads on different processors within respective logical partitions of a data processing system. A predictive error is a prediction of a future hardware error based on the number of available redundant hardware devices associated with a faulty hardware device. For example, if two spare lanes are available within an interconnect and one of the two spare lanes is already enabled due to a previous interconnect error, then the partition management firmware predicts that failure will occur after the second spare lane is used for a subsequent interconnect error. Once errors are detected or corrected, the service processor reports this information to the partition management firmware, which in turn forwards this information to the operating system. The partition management firmware keeps track of these detected or corrected errors in the hardware. The partition management firmware takes into consideration these hardware errors and recovery actions taken when scheduling workloads on the different processors within different logical partitions.

For example, the partition management firmware will schedule a workload, which is known to be memory intensive, on a logical partition based on the following rules: 1) schedule the workload on a core of a processor where less than a threshold number of L2 cache lines associated with the core within the logical partition are deleted; 2) schedule the workload on one of the cores of a processor where less than a threshold number of L3 cache lines associated with the core within the logical partition are deleted; 3) schedule the workload on a processor where less than a threshold number of memory interconnect errors associated with the processor within the logical partition are detected; 4) schedule the workload on a processor where less than a threshold number of DIMMs associated with the processor in the logical partition are isolated; and 5) schedule the workload on a processor where less than a threshold number of cores of the processor are active and less than a threshold number of L3 cache lines associated with the processor within the logical partition are deleted. This helps cores of a processor obtain access to more L3 cache space, thus resulting in increased performance of the processor.

As another example, the partition management firmware will schedule a workload, which is known to trigger cache thrashing (i.e., constant data swapping in a cache), on a logical partition based on the following rules: 1) schedule the workload on a core of a processor where less than a threshold number of L2 cache lines associated with the core within the logical partition are deleted; 2) schedule the workload on one of the cores of a processor where less than a threshold number of L3 cache lines associated with the core within the logical partition are deleted; and 3) schedule the workload on a processor where less than a threshold number of cores of the processor are active and less than a threshold number of L3 cache lines associated with the processor within the logical partition are deleted.

As a further example, the partition management firmware will schedule a workload, which is known to access dynamic random access memory (DRAM) addresses more than a predetermined threshold, on a logical partition based on the following rules: 1) schedule the workload on a processor where less than a threshold number of memory interconnect errors associated with the processor are detected; and 2) schedule the workload on a processor where less than a threshold number of DIMMs associated with the processor are isolated due to errors.

In the case of split-core enabled processors with symmetrical multi-threading (SMT) where multiple logical partitions may be simultaneously scheduled across hardware threads within the same core, the partition management firmware will select logical partitions to be scheduled on the same core based on the following rules: 1) schedule logical partitions on a same core of a processor where less than a threshold number of L2 cache lines associated with the core are deleted; and 2) schedule the logical partitions on one of the cores of a processor where less than a threshold number of L3 cache lines are deleted.

Further, the partition management firmware and operating system may utilize predictive error data when scheduling workloads to ensure data integrity and reliability. The service processor feeds this predictive error data and hardware repair data to the partition management firmware/operating system layer for continued and optimal use of hardware devices within the data processing system.

Thus, the partition management firmware tracks the performance of processors and assigns workloads according to predefined rules. The rules may be based upon predictive errors and hardware conditions. As a result, the partition management firmware selectively assigns workloads to processors in response to detecting hardware error conditions associated with the processors, such as memory errors or interconnect errors. For example, the partition management firmware may selectively assign workloads to one of the cores on one of the processors in a multi-processor system in response to detecting error conditions in a shared cache. Correction of the error conditions in the shared cache may be to selectively delete certain cache lines within the shared cache upon detecting memory errors. In the case of error conditions in the shared cache, the core is still usable and would be effective for workloads that do not rely too much on the shared cache.

As another example, the partition management firmware may selectively assign workloads to one of the cores of one of the processors within a multi-processor system in response to detecting error conditions in an interconnect between processors. Correction of the error conditions in the interconnect between processors may be to selectively disable certain interconnect lanes and enabling other spare lanes within the interconnect upon detecting the interconnect errors. In the case of error conditions in the interconnect between processors, the processors and cores are still usable. However, in the event of a workload running on processor "A" having the need to access memory behind processor "B" through a faulty interconnect between processors "A" and "B", the partition management firmware assigns the workload of processor "A" to a processor "C" where the interconnect between processors "B" and "C" has not encountered any errors.

Thus, illustrative embodiments of the present invention provide a computer implemented method, computer system, and computer program product for scheduling workloads on processors based on detected hardware errors. In response to a data processing system determining that a hardware error is detected in hardware of the data processing system, the data processing system determines whether the hardware error is a cache error. In response to the data processing system determining that the hardware error is a cache error, the data processing system determines whether execution of a workload on a processor is changing contents of a cache associated with the cache error more than a cache usage threshold value. In response to the data processing system determining that the execution of the workload on the processor is changing the contents of the cache associated with the cache error more than the cache usage threshold value, the data processing system determines whether the cache associated with the cache error is private to a particular core in the processor. Then, in response to the data processing system determining that the cache associated with the cache error is private to a particular core in the processor, the data processing system schedules the execution of the workload on a different core of the processor so that the cache associated with the cache error that is private to the particular core is not used. Further, in responsive to the data processing system determining that the cache associated with the cache error is not private to a particular core in the processor, the data processing system schedules the execution of the workload on a different processor so that the cache associated with the cache error that is shared by cores in the processor is not used.

With reference now to FIG. 3, a diagram illustrating an example of a table in accordance with an illustrative embodiment is depicted. Table 300 may be, for example, implemented in a service processor of a data processing system, such as service processor 135 of data processing system 100 in FIG. 1. Alternatively, table 300 may be stored in a storage device, such as memory 191 or NVRAM 192 in FIG. 1.

Table 300 includes errors 302 and actions 304. Errors 302 are types of hardware errors that may be detected within the data processing system by the service processor. The hardware errors may be, for example, memory errors, interconnect errors, processor errors, and the like. Actions 304 are corrective actions taken by the service processor when a corresponding error is detected. A corrective action is a set of one or more steps taken by the service processor to correct, disable, or isolate a faulty hardware device corresponding to a detected hardware error and/or enable a redundant hardware device associated with the faulty hardware device to replace the functionality of the faulty hardware device.

The service processor may utilize the information stored in table 300 to take corrective actions based on the type of errors detected. For example, if the service processor detects error 306 memory errors in cache lines, then the service processor takes action 308 to delete cache lines with errors and mark the cache lines as unusable. If the service processor detects error 310 memory errors in DIMMs, then the service processor takes action 312 to isolate the DIMMS with errors and mark those memory locations as unusable. If the service processor detects error 314 errors in functional units within processor, then the service processor takes action 316 to isolate the processor and mark the processor as unusable for workload scheduling. If the service processor detects error 318 errors in interconnect between processor and memory, then the service processor takes action 320 to execute lane sparing by disabling lanes within the interconnect with errors and enabling a number of spare lanes provided within the interconnect or enabling a different interconnect provided within the data processing system. If the service processor detects error 322 errors in interconnect between two processors on a same node or on different nodes, then the service processor takes action 324 to execute lane sparing by disabling lanes within the interconnect with errors and enabling a number of spare lanes provided within the interconnect or enabling a different interconnect provided within the data processing system.

Of course it should be noted that table 300 is only intended as an example and not intended as a limitation on illustrative embodiments. In other words, table 300 may include any number, type, and combination of hardware errors and corrective actions to be taken. Also it should be noted that in alternative embodiments, table 300 may be implemented in other system components instead of or in addition to the service processor. For example, table 300 may be implemented in one or more operating systems or partition firmware of a data processing system, such as operating systems 202-208 and partition firmware 211-217 of logical partitioned platform 200 in FIG. 2.

Figure 4:
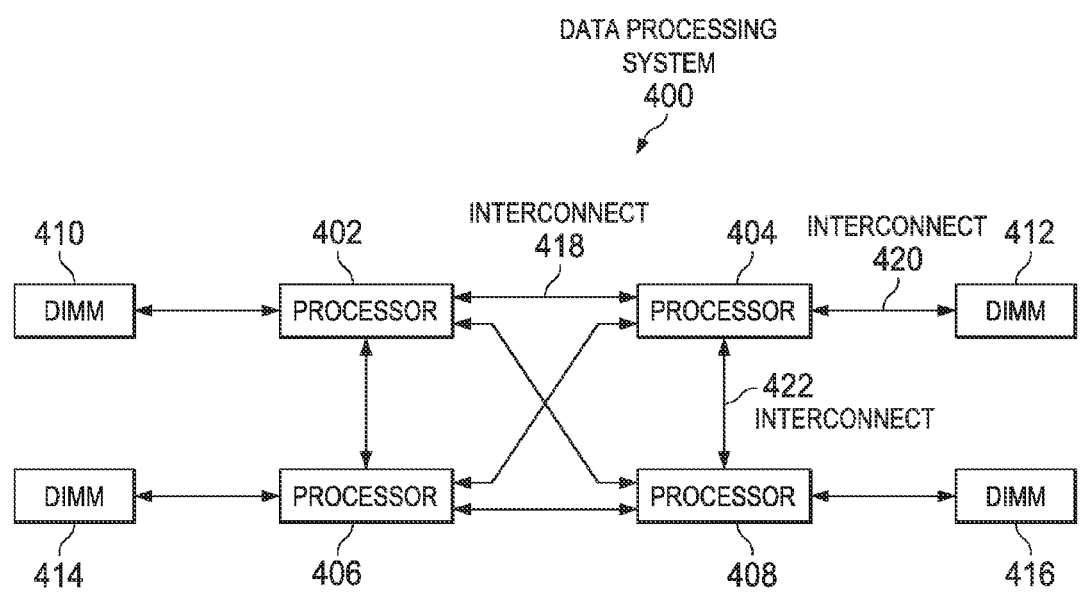
FIG. 4 is a diagram illustrating a specific example of rescheduling a workload from one processor to another processor based on a detected interconnect error in accordance with an illustrative embodiment.

With reference now to FIG. 4, a diagram illustrating a specific example of rescheduling a workload from one processor to another processor based on a detected interconnect error is depicted in accordance with an illustrative embodiment. Data processing system 400 may be, for example, implemented in data processing system 100 in FIG. 1. In addition, data processing system 400 may be a logically partitioned platform, such as logical partitioned platform 200 in FIG. 2.

Data processing system 400 includes processors 402-408 and DIMMs 410-416. Processors 402-408 may be, for example, processors 101-104 in FIG. 1. DIMMs 410-416 may be, for example, local memories 160-163 in FIG. 1. Data processing system 400 schedules workloads for execution by processors 402-408. It should be noted that one or more of processors 402-408 may include a plurality of cores, each of which being capable of executing a different workload. Processors 402-408 utilize DIMMs 410-416 to retrieve data necessary to execute their respective workloads.

In this illustrative example, data processing system 400 performs lane sparing on one of the inter processor interconnects due to an interconnect error detected by a service processor, such as service processor 290 in FIG. 2. Illustrative embodiments will schedule workloads on data processing system 400 in such a way as to minimize the usage of the interconnect on which the error was detected. As a result, illustrative embodiments may reduce the probability of further interconnect errors.

For example, in this illustration the workload scheduled on processor 402 needs to access data stored on DIMM 412, which is connected to processor 404, via interconnect 418 between processor 402 and processor 404 and interconnect 420 between processor 404 and DIMM 412. However, in this example interconnect 418 between processors 402 and 404 has encountered an error. Consequently, data processing system 400 moves the workload scheduled on processor 402 to processor 408, thereby reducing the usage of interconnect 418 between processors 402 and 404 and reducing the probability of further interconnect errors on interconnect 418. Processor 408 may now access the data necessary to execute the workload moved from processor 402 to processor 408 from DIMM 412 via interconnect 422 between processors 408 and 404 and interconnect 420 between processor 404 and DIMM 412.

Of course it should be noted that data processing system 400 is only intended as an example and not intended as a limitation on illustrative embodiments. In other words, data processing system 400 may include any number of and any combination of processors, DIMMs, and interconnects. Also it should be noted that data processing system 400 may include other system devices, such as one or more caches for faster data access.

With reference now to FIG. 5, a flowchart illustrating a process for error detection and reporting is shown in accordance with an illustrative embodiment. The process shown in FIG. 5 may be implemented in a data processing system, such as, for example, data processing system 100 in FIG. 1.

The process begins when the data processing system monitors hardware of the data processing system to detect errors during execution of a workload (step 502). The data processing system may use, for example, a service processor, such as service processor 135 in FIG. 1, to monitor the hardware of the data processing system. While monitoring the hardware in step 502, the data processing system makes a determination as to whether a hardware error is detected in the hardware of the data processing system (step 504).

If the data processing system determines that a hardware error is not detected in the hardware of the data processing system, no output of step 504, then the process returns to step 502 where the data processing system continues to monitor for hardware errors. If the data processing system determines that a hardware error is detected in the hardware of the data processing system, yes output of step 504, then the data processing system makes a determination as to whether redundant hardware is available for faulty hardware associated with the detected hardware error (step 506). If the data processing system determines that redundant hardware is not available for the faulty hardware associated with the detected hardware error, no output of step 506, then the data processing system isolates the faulty hardware associated with the detected hardware error (step 508). Then, the data processing system logs a critical error associated with the faulty hardware (step 510). In addition, the data processing system reports the error to partition management firmware, such as partition management firmware 210 in FIG. 2 (step 512). Thereafter, the process returns to step 502 where the data processing system continues to monitor for hardware errors.

Returning now to step 506, if the data processing system determines that redundant hardware is available for the faulty hardware associated with the detected hardware error, yes output of step 506, then the data processing system disables the faulty hardware associated with the detected hardware error (step 514). In addition, the data processing system enables redundant hardware associated with the faulty hardware (step 516). Further, the data processing system logs a predictive error based on redundant hardware availability information (step 518). Thereafter, the process returns to step 512 where the data processing system reports the error to the partition management firmware.

With reference now to FIG. 6, a flowchart illustrating a process for scheduling execution of a workload based on hardware errors is shown in accordance with an illustrative embodiment. The process shown in FIG. 6 may be implemented in a data processing system, such as, for example, data processing system 100 in FIG. 1.

The process begins when the data processing system executes a workload on a processor of the data processing system, such as processor 402 of data processing system 400 in FIG. 4 (step 602). Then, the data processing system makes a determination as to whether a new workload is available (step 604). If the data processing system determines that a new workload is not available, no output of step 604, then the data processing system makes a determination as to whether a hardware error is detected in hardware of the data processing system (step 606). If the data processing system determines that a hardware error is not detected in the hardware of the data processing system, no output of step 606, then the process returns to step 602 where the data processing system continues to execute the workload. If the data processing system determines that a hardware error is detected in the hardware of the data processing system, yes output of step 606, then the data processing system retrieves characteristics of the workload (step 608). Characteristics of a workload describe different attributes of the workload. For example, characteristics of a workload may include memory usage by a workload, use of private caches associated with different cores by a workload, use of shared caches associated with different cores by the workload, and location of cores where the workload is currently running memory devices in the data processing system where pages used by the workload are located.

In addition, the data processing system reports the detected hardware error to partition management firmware, such as partition management firmware 210 in FIG. 2 (step 610). Further, the data processing system schedules execution of the workload on a different processor, such as processor 408 in FIG. 4, based on the characteristics of the workload (step 612). Thereafter, the process returns to step 602 where the data processing system continues to execute the workload.

Returning again to step 604, if the data processing system determines that a new workload is available, yes output of step 604, then the data processing system retrieves characteristics of the new workload (step 614). In addition, the data processing system schedules execution of the new workload on another processor, such as processor 406 in FIG. 4, based on the characteristics of the new workload (step 616). Thereafter, the process returns to step 602 where the data processing system continues to execute the workload.

With reference now to FIG. 7, a flowchart illustrating a process for scheduling execution of a workload based on cache errors is shown in accordance with an illustrative embodiment. The process shown in FIG. 7 may be implemented in a data processing system, such as, for example, data processing system 100 in FIG. 1.

The process begins when the data processing system monitors hardware of the data processing system to detect errors during execution of a workload on a processor, such as processor 402 in FIG. 4 (step 702). The data processing system may use, for example, a service processor, such as service processor 135 in FIG. 1, to monitor the hardware of the data processing system. While monitoring the hardware in step 702, the data processing system makes a determination as to whether a hardware error is detected in the hardware of the data processing system (step 704).

If the data processing system determines that a hardware error is not detected in the hardware of the data processing system, no output of step 704, then the process returns to step 702 where the data processing system continues to monitor for hardware errors. If the data processing system determines that a hardware error is detected in the hardware of the data processing system, yes output of step 704, then the data processing system makes a determination as to whether the detected hardware error is a cache error (step 706). If the data processing system determines that the detected hardware error is not a cache error, no output of step 706, then the process returns to step 702 where the data processing system continues to monitor for hardware errors.

If the data processing system determines that the detected hardware error is a cache error, yes output of step 706, then the data processing system makes a determination as to whether the execution of the workload on the processor is changing contents of a cache associated with the cache error more than a cache usage threshold value (step 708). If the data processing system determines that the execution of the workload on the processor is not changing the contents of the cache associated with the cache error more than the cache usage threshold value, no output of step 714, then the data processing system keeps the execution of the workload on the processor (step 710). Thereafter, the process returns to step 702 where the data processing system continues to monitor for hardware errors.

Returning again to step 708, if the data processing system determines that the execution of the workload on the processor is changing the contents of the cache associated with the cache error more than the cache usage threshold value, yes output of step 708, then the data processing system makes a determination as to whether the cache associated with the cache error is private to a particular core in the processor (step 712). If the data processing system determines that the cache associated with the cache error is private to a particular core in the processor, yes output of step 712, then the data processing system schedules the execution of the workload on a different core of the processor so that the cache associated with the cache error that is private to the particular core is not used (step 714). Thereafter, the process returns to step 702 where the data processing system continues to monitor for hardware errors.

Returning again to step 712, if the data processing system determines that the cache associated with the cache error is not private to a particular core in the processor (i.e., the cache is a shared cache between a plurality of cores in the processor), no output of step 712, then the data processing system schedules the execution of the workload on a different processor, such as processor 406 in FIG. 4, so that the cache associated with the cache error that is shared by cores in the processor is not used (step 716). Thereafter, the process returns to step 702 where the data processing system continues to monitor for hardware errors.

With reference now to FIG. 8, a flowchart illustrating a process for scheduling execution of a workload based on interconnect errors is shown in accordance with an illustrative embodiment. The process shown in FIG. 8 may be implemented in a data processing system, such as, for example, data processing system 100 in FIG. 1.

The process begins when the data processing system monitors hardware of the data processing system to detect errors during execution of a workload on a processor, such as processor 402 in FIG. 4 (step 802). The data processing system may use, for example, a service processor, such as service processor 135 in FIG. 1, to monitor the hardware of the data processing system. While monitoring the hardware in step 802, the data processing system makes a determination as to whether a hardware error is detected in the hardware of the data processing system (step 804).

If the data processing system determines that a hardware error is not detected in the hardware of the data processing system, no output of step 804, then the process returns to step 802 where the data processing system continues to monitor for hardware errors. If the data processing system determines that a hardware error is detected in the hardware of the data processing system, yes output of step 804, then the data processing system makes a determination as to whether the detected hardware error is an interconnect error (step 806). If the data processing system determines that the detected hardware error is not an interconnect error, no output of step 806, then the process returns to step 802 where the data processing system continues to monitor for hardware errors.

If the data processing system determines that the detected hardware error is an interconnect error, yes output of step 806, then the data processing system makes a determination as to whether the execution of the workload on the processor is using an interconnect associated with the interconnect error more than an interconnect usage threshold value (step 808). If the data processing system determines that the execution of the workload on the processor is using the interconnect associated with the interconnect error more than the interconnect usage threshold value, yes output of step 808, then the data processing system schedules the execution of the workload on a different processor, such as processor 408 in FIG. 4, so that the interconnect associated with the interconnect error is not used (step 810). Thereafter, the process returns to step 802 where the data processing system continues to monitor for hardware errors.

Returning again to step 808, if the data processing system determines that the execution of the workload on the processor is not using the interconnect associated with the interconnect error more than the interconnect usage threshold value, no output of step 808, then the data processing system keeps the execution of the workload on the processor (step 812). Thereafter, the process returns to step 802 where the data processing system continues to monitor for hardware errors.

With reference now to FIG. 9, a flowchart illustrating a process for scheduling execution of a workload based on memory errors is shown in accordance with an illustrative embodiment. The process shown in FIG. 9 may be implemented in a data processing system, such as, for example, data processing system 100 in FIG. 1.

The process begins when the data processing system monitors hardware of the data processing system to detect errors during execution of a workload on a processor, such as processor 402 in FIG. 4 (step 902). The data processing system may use, for example, a service processor, such as service processor 135 in FIG. 1, to monitor the hardware of the data processing system. While monitoring the hardware in step 902, the data processing system makes a determination as to whether a hardware error is detected in the hardware of the data processing system (step 904).

If the data processing system determines that a hardware error is not detected in the hardware of the data processing system, no output of step 904, then the process returns to step 902 where the data processing system continues to monitor for hardware errors. If the data processing system determines that a hardware error is detected in the hardware of the data processing system, yes output of step 904, then the data processing system makes a determination as to whether the detected hardware error is a memory error that results in isolation of pages in a memory (step 906). The memory may be, for example, DIMM 410 in FIG. 4.

If the data processing system determines that the detected hardware error is not a memory error that results in isolation of pages in a memory, no output of step 906, then the process returns to step 902 where the data processing system continues to monitor for hardware errors. If the data processing system determines that the detected hardware error is a memory error that results in isolation of pages in a memory, yes output of step 906, then the data processing system makes a determination as to whether the execution of the workload on the processor is using the pages of the memory associated with the memory error more than a memory usage threshold value (step 908). If the data processing system determines that the execution of the workload on the processor is using the pages of the memory associated with the memory error more than the memory usage threshold value, yes output of step 908, then the data processing system schedules the execution of the workload on a different processor, such as processor 408 in FIG. 4, so that the memory associated with the memory error is not used (step 910). Thereafter, the process returns to step 902 where the data processing system continues to monitor for hardware errors.

Returning again to step 908, if the data processing system determines that the execution of the workload on the processor is not using the pages of the memory associated with the memory error more than the memory usage threshold value, no output of step 908, then the data processing system keeps the execution of the workload on the processor (step 912). Thereafter, the process returns to step 902 where the data processing system continues to monitor for hardware errors.

Thus, illustrative embodiments of the present invention provide a computer implemented method, data processing system, and computer program product for scheduling a workload on a processor of a logical partition based on detected hardware errors. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer implemented method for scheduling workloads based on detected hardware errors, the computer implemented method comprising:
   responsive to a data processing system determining that a hardware error is detected in hardware of the data processing system, determining, by the data processing system, whether the hardware error is a cache error;
   responsive to the data processing system determining that the hardware error is a cache error, determining, by the data processing system, whether execution of a workload on a processor is changing contents of a cache associated with the cache error more than a cache usage threshold value;
   responsive to the data processing system determining that the execution of the workload on the processor is changing the contents of the cache associated with the cache error more than the cache usage threshold value, determining, by the data processing system, whether the cache associated with the cache error is private to a particular core in the processor; and
   responsive to the data processing system determining that the cache associated with the cache error is private to a particular core in the processor, scheduling, by the data processing system, the execution of the workload on a different core of the processor so that the cache associated with the cache error that is private to the particular core is not used.

2. The computer implemented method of claim 1 further comprising:
   responsive to the data processing system determining that the cache associated with the cache error is not private to a particular core in the processor, scheduling, by the data processing system, the execution of the workload on a different processor so that the cache associated with the cache error that is shared by cores in the processor is not used.

3. The computer implemented method of claim 1 further comprising:
   determining, by the data processing system, whether the hardware error is an interconnect error;
   responsive to the data processing system determining that the hardware error is an interconnect error, determining, by the data processing system, whether the execution of the workload on the processor is using an interconnect associated with the interconnect error more than an interconnect usage threshold value; and
   responsive to the data processing system determining that the execution of the workload on the processor is using the interconnect associated with the interconnect error more than the interconnect usage threshold value, scheduling, by the data processing system, the execution of the workload on a different processor so that the interconnect associated with the interconnect error is not used.

4. The computer implemented method of claim 3, wherein the interconnect is a communication interface device between hardware devices.

5. The computer implemented method of claim 1 further comprising:
   determining, by the data processing system, whether the hardware error is a memory error that results in isolation of pages in a memory;
   responsive to the data processing system determining that the hardware error is a memory error that results in isolation of pages in a memory, determining, by the data processing system, whether execution of a workload on a processor is using the pages of the memory associated with the memory error more than a memory usage threshold value; and
   responsive to the data processing system determining that the execution of the workload on the processor is using the pages of the memory associated with the memory error more than the memory usage threshold value, scheduling, by the data processing system, the execution of the workload on a different processor so that the memory associated with the memory error is not used.

6. The computer implemented method of claim 1 further comprising:
   responsive to the data processing system determining that a hardware error is detected in the hardware of the data processing system, retrieving, by the data processing system, characteristics of the workload; and
   scheduling, by the data processing system, the execution of the workload on a different processor based on the characteristics of the workload.

7. The computer implemented method of claim 6, wherein the characteristics of the workload includes at least one of memory usage by the workload, use of private caches associated with different cores by the workload, use of shared caches associated with the different cores by the workload, and location of cores where the workload is currently running memory devices in the data processing system where pages used by the workload are located.

8. A data processing system for scheduling workloads based on detected hardware errors, the data processing system comprising:
   a bus system;
   a storage device connected to bus system, wherein the storage device stores computer usable program code; and
   a processor device connected to the bus system, wherein the processor device executes the computer usable program code to determine whether a hardware error is a cache error in response to determining that the hardware error is detected in hardware of the data processing system; determine whether execution of a workload on a processor is changing contents of a cache associated with the cache error more than a cache usage threshold value in response to determining that the hardware error is a cache error; determine whether the cache associated with the cache error is private to a particular core in the processor in response to determining that the execution of the workload on the processor is changing the contents of the cache associated with the cache error more than the cache usage threshold value; and schedule the execution of the workload on a different core of the processor so that the cache associated with the cache error that is private to the particular core is not used in response to determining that the cache associated with the cache error is private to the particular core in the processor.

9. The data processing system of claim 8, wherein the processor device further executes the computer usable program code to schedule the execution of the workload on a different processor so that the cache associated with the cache error that is shared by cores in the processor is not used in response to determining that the cache associated with the cache error is not private to a particular core in the processor.

10. The data processing system of claim 8, wherein the processor device further executes the computer usable program code to determine whether the hardware error is an interconnect error; determine whether the execution of the workload on the processor is using an interconnect associated with the interconnect error more than an interconnect usage threshold value in response to determining that the hardware error is an interconnect error; and schedule the execution of the workload on a different processor so that the interconnect associated with the interconnect error is not used in response to determining that the execution of the workload on the processor is using the interconnect associated with the interconnect error more than the interconnect usage threshold value.

11. The data processing system of claim 10, wherein the interconnect is a communication interface device between hardware devices.

12. The data processing system of claim 8, wherein the processor device further executes the computer usable program code to determine whether the hardware error is a memory error that results in isolation of pages in a memory; determine whether execution of a workload on a processor is using the pages of the memory associated with the memory error more than a memory usage threshold value in response to determining that the hardware error is a memory error that results in isolation of pages in a memory; and schedule the execution of the workload on a different processor so that the memory associated with the memory error is not used in response to determining that the execution of the workload on the processor is using the pages of the memory associated with the memory error more than the memory usage threshold value.

13. The data processing system of claim 8, wherein the processor device further executes the computer usable program code to retrieve characteristics of the workload in responsive to determining that a hardware error is detected in the hardware of the data processing system; and schedule the execution of the workload on a different processor based on the characteristics of the workload.

14. A computer program product stored on a computer readable storage device having computer usable program code embodied thereon that is executable by a data processing system for scheduling workloads based on detected hardware errors, the computer program product comprising:
computer usable program code for determining whether a hardware error is a cache error in response to determining that the hardware error is detected in hardware of the data processing system;
computer usable program code for determining whether execution of a workload on a processor is changing contents of a cache associated with the cache error more than a cache usage threshold value in response to determining that the hardware error is a cache error;
computer usable program code for determining whether the cache associated with the cache error is private to a particular core in the processor in response to determining that the execution of the workload on the processor is changing the contents of the cache associated with the cache error more than the cache usage threshold value; and
computer usable program code for scheduling the execution of the workload on a different core of the processor so that the cache associated with the cache error that is private to the particular core is not used in response to determining that the cache associated with the cache error is private to the particular core in the processor.

15. The computer program product of claim 14 further comprising:
computer usable program code for scheduling the execution of the workload on a different processor so that the cache associated with the cache error that is shared by cores in the processor is not used in response to determining that the cache associated with the cache error is not private to a particular core in the processor.

16. The computer program product of claim 14, further comprising:
computer usable program code for determining whether the hardware error is an interconnect error;
computer usable program code for determining whether the execution of the workload on the processor is using an interconnect associated with the interconnect error more than an interconnect usage threshold value in response to determining that the hardware error is an interconnect error; and
computer usable program code for scheduling the execution of the workload on a different processor so that the interconnect associated with the interconnect error is not used in response to determining that the execution of the workload on the processor is using the interconnect associated with the interconnect error more than the interconnect usage threshold value.

17. The computer program product of claim 16, wherein the interconnect is a communication interface device between hardware devices.

18. The computer program product of claim 14 further comprising:
computer usable program code for determining whether the hardware error is a memory error that results in isolation of pages in a memory;
computer usable program code for determining whether execution of a workload on a processor is using the pages of the memory associated with the memory error more than a memory usage threshold value in response to determining that the hardware error is a memory error that results in isolation of pages in a memory; and
computer usable program code for scheduling the execution of the workload on a different processor so that the memory associated with the memory error is not used in response to determining that the execution of the workload on the processor is using the pages of the memory associated with the memory error more than the memory usage threshold value.

19. The computer program product of claim 14 further comprising:
computer usable program code for retrieving characteristics of the workload in response to determining that a hardware error is detected in the hardware of the data processing system; and
computer usable program code for scheduling the execution of the workload on a different processor based on the characteristics of the workload.

20. The computer program product of claim 19, wherein the characteristics of the workload includes at least one of memory usage by the workload, use of private caches associated with different cores by the workload, use of shared caches associated with the different cores by the workload, and location of cores where the workload is currently running memory devices in the data processing system where pages used by the workload are located.

* * * * *